United States Patent [19]

Pontano et al.

[11] 4,191,926
[45] Mar. 4, 1980

[54] METHOD AND APPARATUS FOR INTERFERENCE CANCELLATION AT BASE-BAND USING MULTIPLICATION OF THE DESIRED INTERFERING CARRIERS

[75] Inventors: Benjamin A. Pontano, Gaithersburg; NandKishore M. Chitre, Rockville, both of Md.

[73] Assignee: Communications Satellite Corporation, Washington, D.C.

[21] Appl. No.: 834,027

[22] Filed: Sep. 16, 1977

[51] Int. Cl.² .................................................. H04B 1/10
[52] U.S. Cl. .................................... 325/476; 325/363; 325/65; 329/137
[58] Field of Search ............... 325/472, 473, 474, 475, 325/476, 477, 371, 377, 378, 369, 304, 56, 60, 65, 2, 305, 4, 364, 344, 363; 329/105, 118, 137; 179/1 P

[56] References Cited

U.S. PATENT DOCUMENTS

| | | | |
|---|---|---|---|
| 3,896,385 | 7/1975 | Chitre et al. | 325/363 |
| 3,963,990 | 6/1976 | DiFonzo | 325/476 |
| 3,986,123 | 10/1976 | Tirro et al. | 325/65 |

Primary Examiner—Robert L. Richardson
Assistant Examiner—Tommy P. Chin

Attorney, Agent, or Firm—Sughrue, Rothwell, Mion, Zinn and Macpeak

[57] ABSTRACT

The interference components in a first composite signal are cancelled at baseband frequencies using a second composite signal. The first composite signal has a desired carrier and an interfering carrier. The desired carrier has a constant envelop and is angle modulated with baseband $\phi_1(t)$. The interfering carrier has any type of modulation. The second composite signal has the interfering carrier. The first composite signal is angle demodulated. The first composite signal is also multiplied with the second composite signal. The product signal from the multiplier has a high and a low frequency component. The low frequency component is extracted from the product signal. The low frequency component is phase shifted by plus 90 degrees when the instantaneous frequency of the desired carrier is greater than the instantaneous frequency of the interfering carrier. When the instantaneous frequency relationship is reversed, the low frequency component is phase shifted by minus 90 degrees. The phase shifted signal is attenuated and then subtracted from the angle demodulated signal, yielding the desired signal component with the interference components cancelled or substantially attenuated. The above technique may be used with a F.M. desired carrier when the angle demodulator is a frequency demodulator.

7 Claims, 7 Drawing Figures

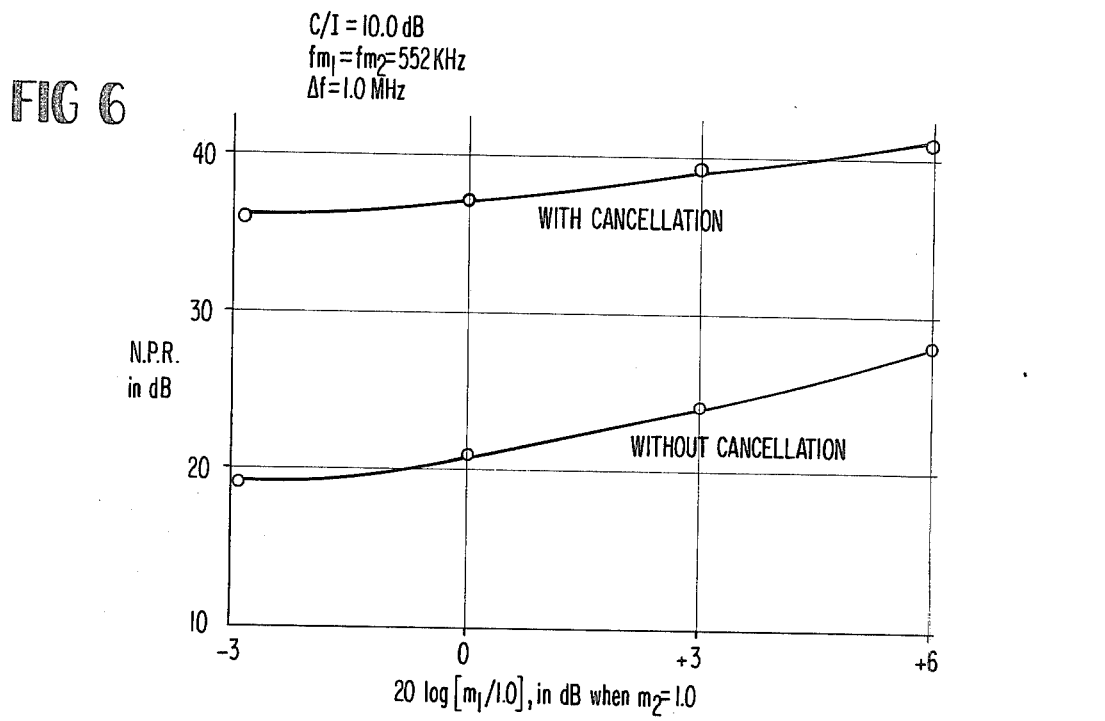
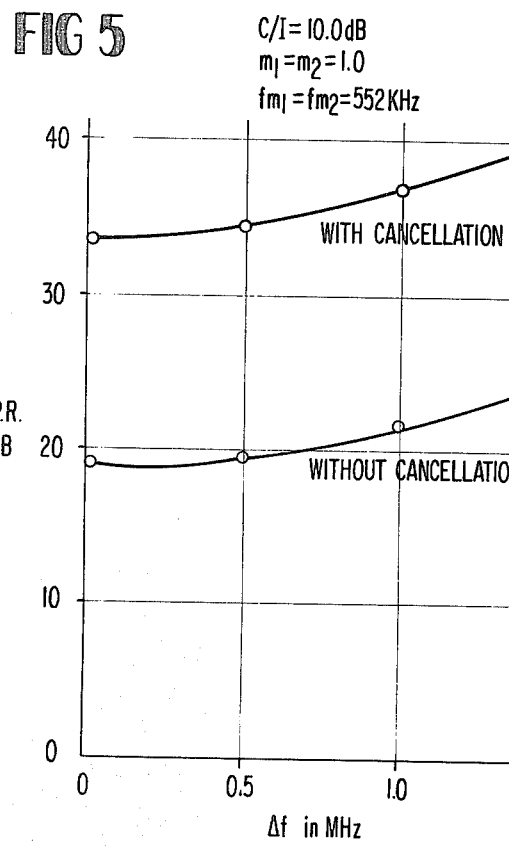
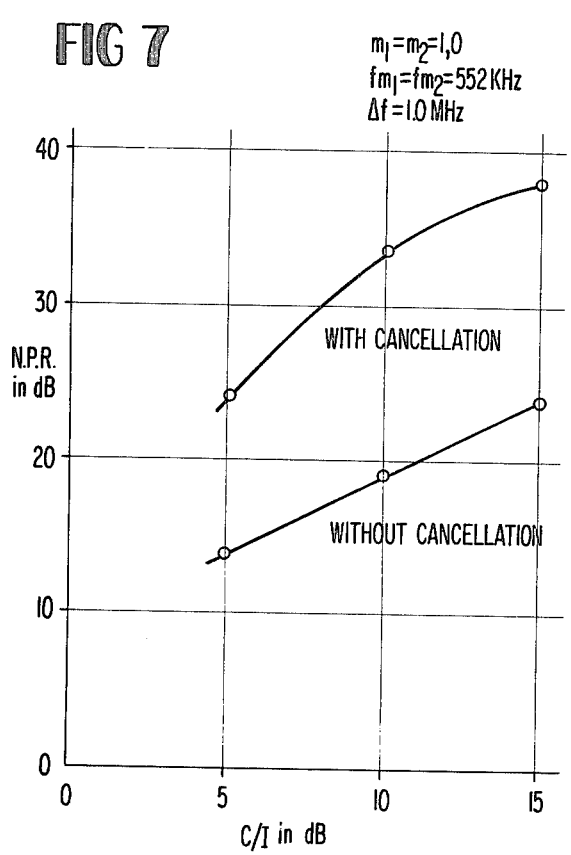

METHOD AND APPARATUS FOR INTERFERENCE CANCELLATION AT BASE-BAND USING MULTIPLICATION OF THE DESIRED INTERFERING CARRIERS

BACKGROUND OF THE INVENTION

The invention is in the field of interference cancellation systems and methods, and in particular is an apparatus and method for cancelling at baseband frequencies interference components in a first composite signal using a second composite signal. The first composite signal has a desired carrier and an interfering carrier. The desired carrier has a constant envelope and is angle modulated with baseband $\phi_1(t)$. The interfering carrier has any type of modulation. The second composite signal includes the interfering carrier.

An angle modulated carrier, whether in the context of telephony or video communications, is a carrier which is either phase modulated or frequency modulated by the modulating signal. In telephony, the modulating signal or baseband modulation may be a composite of a plurality of amplitude modulated frequency separated sub-carriers. In video communications, the baseband modulation is the video signal.

As is well known, R.F. carriers which are not sufficiently separated in frequency will interfere with each other causing distortion in the desired demodulation. Interference between R.F. carriers closely spaced in frequency occurs in many contexts. One such context which is of special concern to the assignee of the present invention is that of satellite communications. An example of a typical R.F. interference situation in satellite communications is shown in FIG. 1. The receiving antenna, typically having very high gain, high front-to-back ratio and directivity, is pointed at the desired signal source, satellite 1, so as to receive the desired carrier therefrom. An interfering carrier from an interfering signal source, satellite 2, is also received.

In certain cases, the desired and interfering carriers originate within the same satellite either from a cross-polarized signal or from a narrow beam satellite antenna pointed elsewhere, and the interfering carrier is sent with the desired carrier to the receiving antenna. Where dual polarization is used, a certain amount of R.F. signal leakage at the feed of the antenna is bound to occur. In this situation, the desired plus interfering carriers are received and amplified by the communications system and then fed to a bandpass filter having a passband tuned to the frequency of the desired carrier. No matter how steep the skirts of the filter, that portion of the interfering carrier which overlaps in frequency the desired carrier is passed by the filter and results after the demodulation process in an interference component superimposed on the desired baseband signal.

Various approaches have been devised to cancel or substantially attenuate the interfering carrier from the desired carrier while both carriers are in the R.F. domain. One such system is disclosed in U.S. Pat. No. 3,963,990 to Di Fonzo, issued June 15, 1976 and assigned to the assignee of the present invention. An article that describes the above invention and which includes a bibliography of relevant references on R.F. interference cancellation is: D. F. Di Fonzo, W. S. Trachtman, A. E. Williams, "Adaptive Polarization Control for Satellite Reuse Systems", Comsat Tech. Rev., Vol. 6, No. 2, 1976 at 253-283.

R.F. interference cancelling methods and apparatus are expensive to construct and maintain because of the complexity and necessary stability of the required circuitry. In order to overcome these deficiencies, the present invention performs the interference cancellation at baseband frequencies.

SUMMARY OF THE INVENTION

In accordance with the present invention, a method and apparatus is provided to cancel or substantially attenuate at baseband frequencies interference components in a first composite signal using a second composite signal. The first composite signal has a desired carrier and an interfering carrier. The desired carrier has a constant envelope and is angle modulated with baseband $\phi_1(t)$. The interfering carrier has any type of modulation. The second composite signal has the interfering carrier. The present invention is based upon a discovery by applicants. The discovery, which came about through analysis and testing, is that the interference components in the first composite signal caused by the interfering carrier can be cancelled or substantially attenuated at baseband frequencies by using the second composite signal in the following procedure:

1. Angle demodulate the first composite signal to produce an angle demodulated signal;
2. Multiply the first composite signal with the second composite signal to produce a product signal having high frequency and low frequency components;
3. Filter the product signal to obtain the low frequency component;
4. Electrically shift the low frequency component by plus 90 degrees when the instantaneous frequency of the desired carrier is greater than the instantaneous frequency of the interfering carrier or electrically shift the low frequency component by minus 90 degrees when the instantaneous frequency of the desired carrier is less than or equal to the instantaneous frequency of the interfering carrier;
5. Electrically attenuate the electrically shifted low frequency component to the level of the angle demodulated signal; and
6. Subtract the attenuated electrically shifted low frequency component from the angle demodulated signal.

The resulting baseband signal is the desired signal component of the first composite signal with the interference component cancelled or substantially attenuated therefrom.

The procedure is also equally applicable to all classes of angle modulation including the case when the desired carrier is being frequency modulated (F.M.) with baseband $\phi_1(t)$ and the demodulator is a frequency demodulator.

BRIEF DESCRIPTION OF THE DRAWINGS

FIGS. 5-7 are graphs of the measurements made in the actual tests of the present invention.

DETAILED DESCRIPTION OF THE PREFERRED EMBODIMENTS

The approach of the present invention is based on a special property of interference between an interference carrier (having any type of modulation) and a desired carrier (having a constant envelope and being angle modulated with baseband $\phi_1(t)$) of a first composite signal and the interference carrier of a second composite signal: the low frequency component of the product of the first composite signal and the second composite signal is equal to the angle-demodulated interference component of the first composite signal shifted by plus or minus 90 degrees. This special property thus allows recovery of the demodulated desired signal of the first composite signal at baseband frequencies by subtraction of the low frequency component of the product of the first and second composite signals from the angle-demodulated first composite signal. This baseband signal subtraction eliminates the requirement that interference cancelled be performed at radio frequencies (R.F.). Since the interference cancellation is done at baseband, low frequency circuits can be used. Baseband interference cancellation eliminates the circuit stability and complexity problems associated with R.F. cancellation and, therefore, the method and apparatus of the present invention is easier to operate and maintain and is lower in cost.

Figure 1:
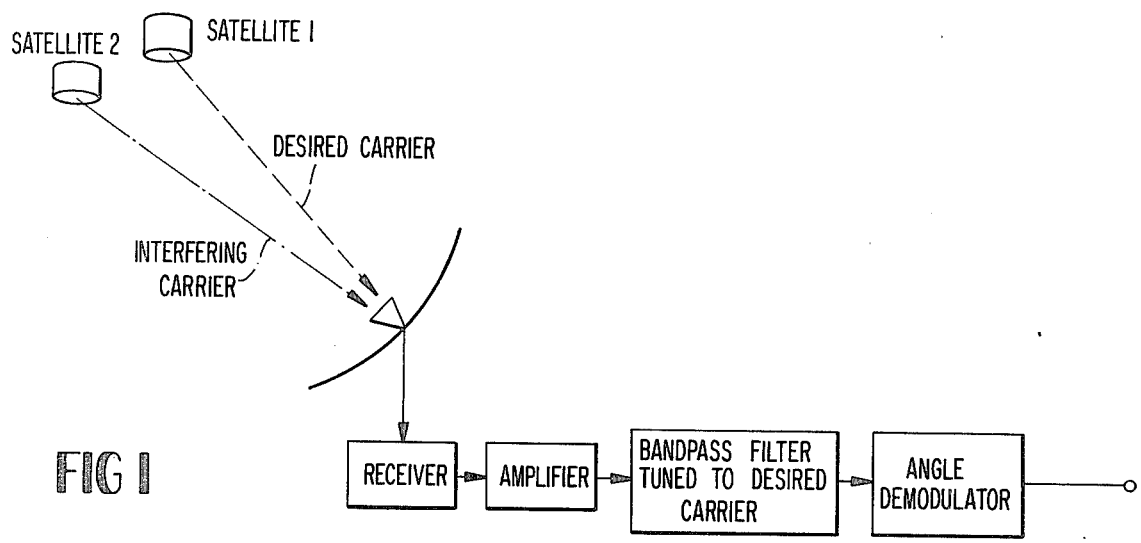
FIG. 1 is a block diagram of the typical interference situation which is the concern of the present invention.
Figure 2:
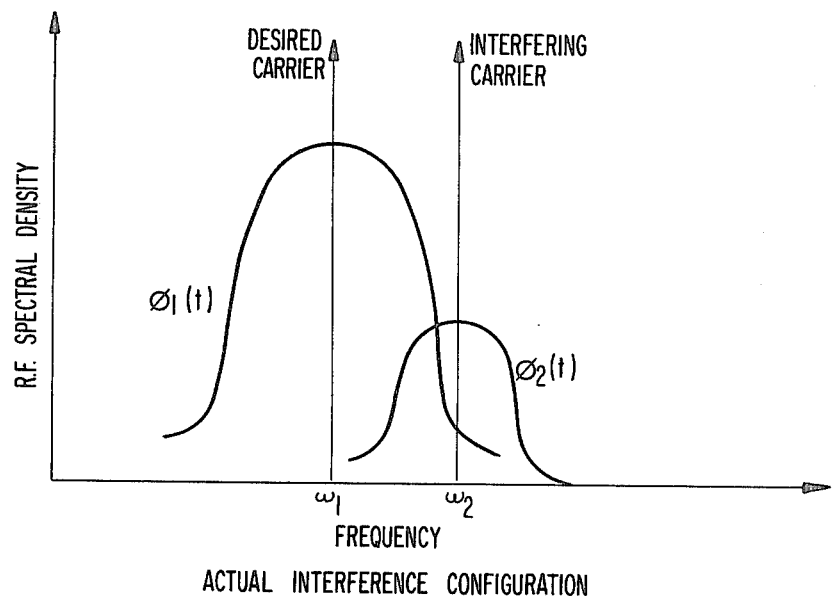
FIG. 2 is a graph of a typical interference configuration between a desired carrier and an interfering carrier which are closely spaced in frequency.
Figure 3:
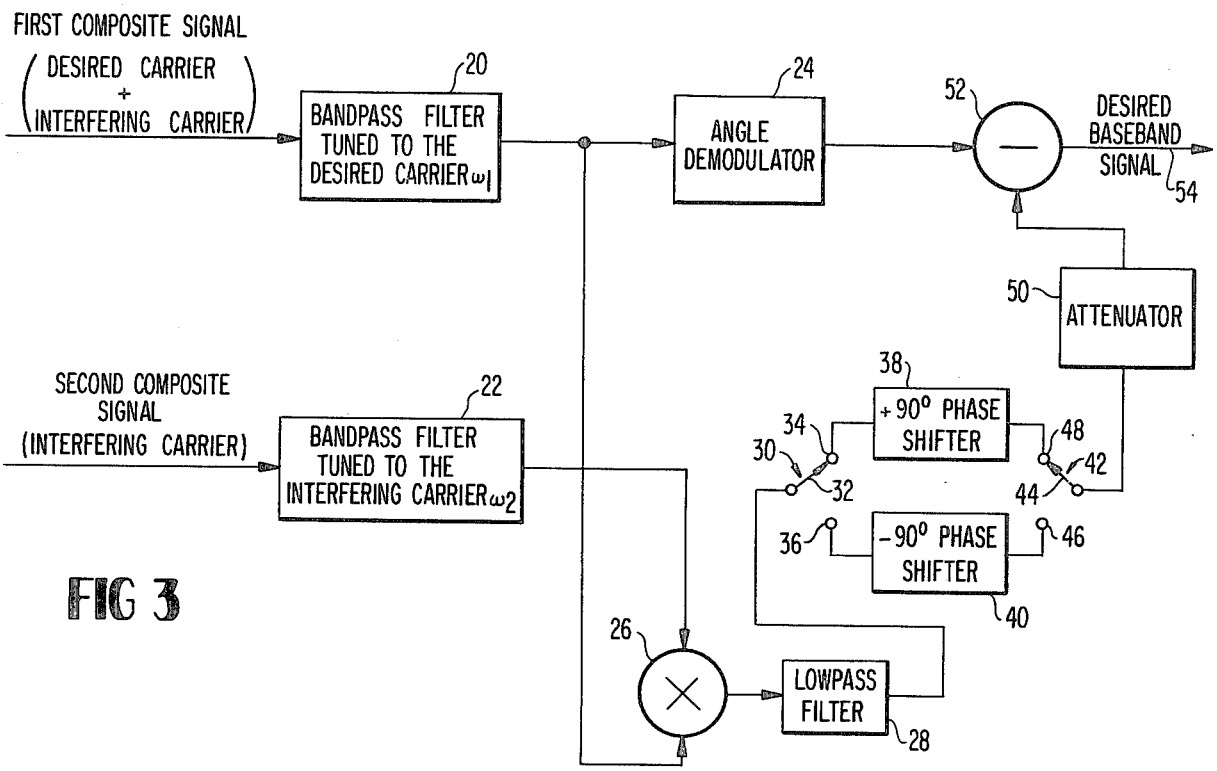
FIG. 3 is a block diagram of a preferred embodiment of the static version of the present invention.

The static version of the invention, as shown in FIG. 3, allows the desired signal $\phi_1(t)$ of desired carrier $\omega_1$ to be separated from the interference effects of carrier $\omega_2$, as shown in FIG. 2, at baseband frequencies. Desired carrier $\omega_1$ and interfering carrier $\omega_2$ are present in a first composite signal. Interfering carrier $\omega_2$ is also present in a second composite signal.

The theory of baseband frequency signal subtraction begins with an angle modulated desired carrier having a constant envelope expressed as:

$$v_1(t) = A_1[\omega_1 t + \phi_1(t)] \quad (1)$$

where:
A = amplitude of unmodulated desired carrier voltage
$\omega_1$ = frequency of unmodulated desired carrier (radians/sec.)
$\phi_1(t)$ = desired angle-modulated signal The desired carrier may utilize any type of angle modulation: phase modulation (P.M.) in either analog or digital (P.S.K.) form; frequency modulation (F.M.) in either analog or digital (F.S.K.) form.

Consider that an interfering carrier being modulated in amplitude and phase is given by:

$$v_2(t) = A_2(t)\cos[\omega_2 t + \phi_2(t) + \mu] \quad (2)$$

where:
$A_2(t)$ = amplitude modulation on interfering carrier voltage
$\omega_2$ = frequency of unmodulated interfering carrier (radians/sec.)
$\phi_2(t)$ = interfering angle-modulated signal
$\mu$ = arbitrary initial phase angle The demodulated interference of the first composite signal at the output of an ideal demodulator is given by:

$$\lambda(t) = Im \ln\left\{1 + \frac{Z_2(t)}{Z_1(t)}\right\} \quad (3)$$

where:
$Z_1(t)$ and $Z_2(t)$ are the complex notation for the desired and interfering carriers, respectively
$v_1(t)$ = desired carrier = $Re[Z_1(t)]$
$v_2(t)$ = intefering carrier = $Re[Z_2(t)]$
$Imx$ = imaginary part of the complex variable x Equation (3) is disclosed in B. A. Pontano, J. C. Fuenzalida and N. K. M. Chitre, "Inteference Into Angle Modulated Systems Carrying Multichannel Telephony Signals", IEEE Transactions on Communications COM-21, No. 6, June 1973, pp. 714–727. Equation (3) is utilized in an invention which produces an accurate interference model or means of predicting interference between R. F. carriers closely spaced in frequency that is disclosed in U.S. Pat. No. 3,896,385, issued July 22, 1975, to the present inventors and assigned to the assignee of the present invention.

Substituting equation (1) for $v_1(t)$ and equation (2) for $v_2(t)$ of equation (3) yields $$\lambda(t) = \quad (4)$$
$$Im \ln\left\{1 + \frac{A_2(t)}{A_1}\exp j\left[(\omega_2 - \omega_1)t + \phi_2(t) - \phi_1(t) + \mu\right]\right\}$$

The angle demodulated desired signal can be readily separated from the interference component of the first composite signal when the amplitude of the desired carrier voltage is substantially greater than the amplitude of the interfering carrier voltage; a typical minimum ratio for satisfactory separation is 10 to 1, desired carrier to interfering carrier. This is designated as "low interference". As is shown in the actual experiment results, the invention can also operate at reduced performance when the ratio is as low as 4 to 1.

Assuming there is low interference between the desired carrier and the interfering carrier of the first composite signal, which is expressed as $|A_2(t)|/A_1 << 1$, the demodulated interference component given by equation (4) simplifies to:

$$\lambda(t) \approx \frac{A_2(t)}{A_1} \cdot \sin\left[(\omega_2 - \omega_1)t + \phi_2(t) - \phi_2(t) + \mu\right] \quad (5)$$

The multiplication of the first composite signal with the second composite signal produces a product signal having a low frequency component and a high frequency component. Ignoring the modulus components produced by the multiplication of the interference carrier of the first composite signal and the interference carrier of the second composite signal, the product signal is given by:

$$v_1(t) \cdot v_2(t) = \frac{A_1 A_2(t)}{2} \cdot \cos\left[(\omega_2 + \omega_1)t + \phi_2(t) + \phi_1(t) + \mu\right] + \quad (6)$$
$$\frac{A_1 A_2(t)}{2} \cdot \cos\left[(\omega_2 - \omega_1)t + \phi_2(t) - \phi_1(t) + \mu\right]$$

The low frequency component of the product signal of equation (6) is expressed as:

$$\frac{A_1 A_2(t)}{2} \cdot \cos\left[(\omega_2 - \omega_1)t + \phi_2(t) - \phi_1(t) + \mu\right] \quad (7)$$

It is now apparent that the angle-demodulated interference component of equation (5) is identical to the low frequency component of the product signal shifted in phase by ±90 degrees. Thus, in the generalized angle modulation case, the low frequency component of the product signal shifted in phase by ±90 degrees and attenuated by a factor of $2/(A_1)^2$ is equal to the angle-demodulated interference component of the first composite signal. This mathematical relationship allows recovery at baseband frequencies of the angle-demodulated desired signal of the first composite signal by subtraction of the low frequency component of the product signal of the first and second composite signals from the angle-demodulated first composite signal.

In the angle modulation case of frequency modulation (F.M.), the demodulated interference component is the differentiation of equation (5), expressed as:

$$\lambda(t) \approx \frac{A_2(t)}{A_1}[\omega_2 - \omega_1 + \dot{\phi}_2(t) - \dot{\phi}_1(t)] \cdot \quad (8)$$
$$\cos[(\omega_2 - \omega_1)t + \phi_2(t) - \phi_1(t) + \mu] +$$
$$\frac{\dot{A}_2(t)}{A_1} \cdot \sin[(\omega_2 - \omega_1)t + \phi_2(t) - \phi_1(t) + \mu]$$

Furthermore, the low frequency component of the product signal produced by the multiplication of the first composite signal with the second composite signal in the F.M. case is the differentiation of equation (7), expressed as:

$$\frac{A_1 A_2(t)}{2}[\omega_2 - \omega_1 + \dot{\phi}_2(t) - \dot{\phi}_1(t)]\sin[(\omega_2 - \omega_1)t + \phi_2(t) - \quad (9)$$
$$\phi_1(t) + \mu] + \frac{A_1 \dot{A}_2(t)}{2}\cos[(\omega_2 - \omega_1)t + \phi_2(t) - \phi_1(t) + \mu]$$

It is now apparent that the demodulated interference component of equation (8) is identical to the low frequency component of the product signal of equation (9) shifted in phase ±90 degrees. Thus, in the F.M. case, the low frequency component of the product of the first composite signal and the second composite signal shifted by ±90 degrees and attenuated by a factor of $2/(A_1)^2$ is equal to the demodulated interference component of the first composite signal. This mathematical relationship allows recovery at baseband frequencies of the demodulated desired signal of the first composite signal by the subtraction of the low frequency component of the product of the first and second composite signals.

The sign of the 90 degree phase shift in both the generalized angle modulation case and the angle modulation F.M. case is dependent upon the sign of factor $[(\omega_2 - \omega_1)t + \phi_2(t) - \phi_1(t) + \mu]$. If the sign of this factor is positive, a minus 90 degree phase shift of the low frequency component of the product signal is required. This corresponds to the situation, as shown in FIG. 2, where the frequency $\omega_1$ of the desired carrier is less than the frequency $\omega_2$ of the interfering carrier. Alternately, when the sign of the above factor is negative, a positive 90 degree phase shift of the low frequency component of the product signal is required.

It should be noted that the invention can cancel at baseband more than one interfering carrier. The only requirement in such a situation is that the frequency of each interfering carrier lie on the same side of the frequency of the desired carrier so that each respective baseband interference component receives the proper phase shift.

A block diagram of the preferred embodiment of the static version of the invention is illustrated in FIG. 3. It is to be understood that the block diagram applies to both the generalized angle modulation case and to the angle modulation case of F.M.; any differences between the two are noted in the following description.

A first composite signal having the desired carrier and the interfering carrier is applied to the input of a bandpass filter 20 tuned to $\omega_1$, the frequency of the desired carrier. This applied input signal is typically from the receiving antenna for the desired carrier; this antenna has also received the interfering carrier, at a low signal level. This situation is very common in satellite communications, especially when a dual-polarized signal is being picked up by one antenna. Filter 20 can be any type of filter having a passband sufficient to pass all of the desired carrier and to block or substantially attenuate all signals outside the frequency band of desired carrier.

A second composite signal having the interfering carrier is applied to the input of a bandpass filter 22 tuned to $\omega_2$, the frequency of interfering carrier. This applied input signal is typically from the receiving antenna for the interfering carrier; this antenna has also received the desired carrier at a low signal level. This interference situation is very common in satellite communications. Typically in satellite communications systems one antenna is used to receive a dual polarized signal and the antenna feed for each polarization picks up low signal level components of the other polarization. Filter 20 can be any type of filter having a passband sufficient to pass all of the interfering carrier and to block or substantially attenuate all signals outside the frequency band of carrier 2.

Besides the dual-polarization situation, the second composite signal may be obtained, for example, by using a separate receiving antenna directed towards the interfering carrier. This interference situation often arises in microwave link transmission systems where the interfering carrier is being transmitted from a location different than that of the desired carrier. The only signal requirement for the present invention is that a second composite signal be available having the interfering carrier.

The signal at the output of filter 20 having the desired carrier plus interference is applied to the input of a demodulator 24 and to the first input of a multiplier 26. In the general angle modulation case, demodulator 26 must be capable of detecting angle modulation; in the F.M. case, demodulator 26 must also include a differentiator so that it is capable of detecting F.M. One example of a commercially available demodulator capable of detecting F.M. is given below.

The signal at the output of filter 22 having the interfering carrier is applied to the second input of multiplier 26. Multiplier 26 must be capable of multiplying the applied first composite signal at its first input with the applied second composite signal at its second input. Such multipliers are well known in the art and are readily available on the commercial market.

The product signal at the output of multiplier 26 has a high frequency component and a low frequency component. This product signal is applied to the input of a low pass filter 28. Low pass filter 28 has a cut-off frequency below that of the high frequency component of the product signal. Such low pass filters were well known in the art and are readily available on the commercial market.

The signal at the output of low pass filter 28, called the low frequency component, is applied to a switch, designated generally by the reference numeral 30. Switch 30 has an arm 32 switchable between a first position for electrical connection with a contact terminal 34 and a second position for electrical connection with a contact terminal 36. Terminal 34 is in electrical connection with the input of a $+90°$ phase shifter 38. Shifter 38 may be an inductor-capacitor or a resistor-capacitor network or any other arrangement which produces a $+90°$ electrical phase shift to the applied low frequency component. Contact terminal 36, on the other hand, is in electrical connection with the input of a $-90°$ phase shifter 40. Shifter 40 may be an inductor-capacitor or a resistor-capacitor network or any other arrangement which produces a $-90°$ electrical phase shift to the applied low frequency component.

The output from demodulator 24, which has the desired and interference components at baseband frequencies, is applied to a first input of a subtractor means 52. The low frequency component signal from a switch designated generally by the reference numeral 42 is applied to an attenuator 50. Attenuator 50 attenuates the low frequency component signal by an amount equal to $2/(A_1)^2$. The level of the low frequency component signal at the output of attenuator 50 is at approximately the same level as that of the output signal from demodulator 24. The output of attenuator 50 is applied to the second input of subtractor means 52. Subtractor means 52 provides a signal at its output which is equal to the signal at its first input subtracted by the signal at its second input. The output signal of subtractor means 52, which is the desired baseband signal of the first composite signal, is applied to a line 54.

When frequency $\omega_2$ of the interfering carrier is less than the frequency $\omega_1$ of the desired carrier, the low frequency component from multiplier 26 must be shifted by $+90°$, as described previously. In this situation, arm 32 of switch 30 is moved to its first position in electrical connection with contact terminal 34 and arm 44 of switch 42 is moved to its first position in electrical connection with a contact terminal 48.

When, however, the frequency $\omega_2$ of the interfering carrier is greater than the frequency $\omega_1$ of the desired carrier, the low frequency component from multiplier 26 must be shifted by a $+90°$, as described previously. In this situation, arm 32 of switch 30 is moved to its second position in electrical connection with contact terminal 36 and arm 44 of switch 42 is moved to its second position in electrical connection with a contact terminal 46.

In the typical operation of the static version of the invention, the operator sets switch 30 to the position that produces the best interference cancelled as shown by the lack of interference on the desired baseband signal on line 54. Further, the operator adjusts the attenuation level of attenuator 50 to the value that produces the maximum level of interference cancellation. It must be noted that in actual practice it is often difficult to determine the precise value of $2/(A_1)^2$, and therefore, the attenuation level is set to that which produces maximum interference cancellation.

Figure 4:
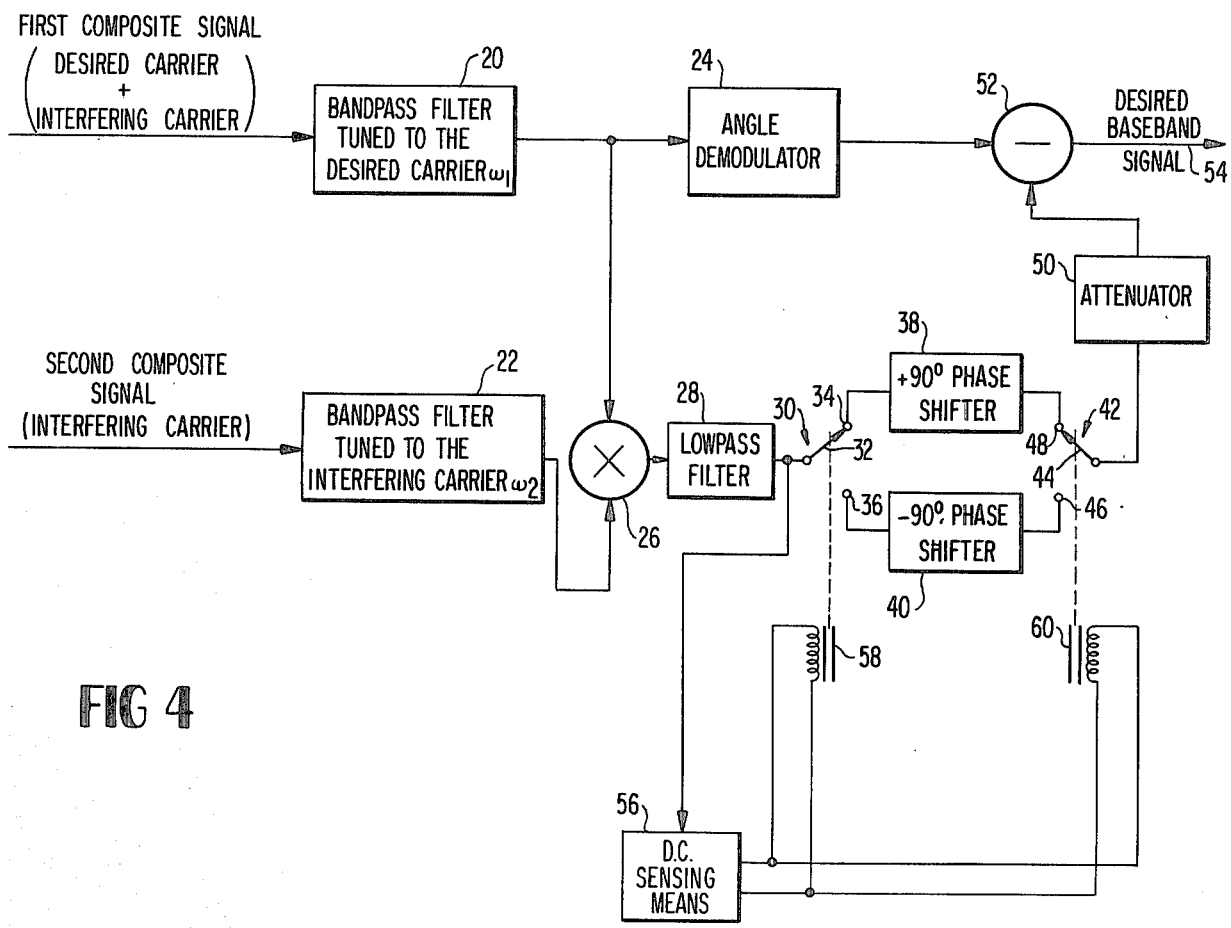
FIG. 4 is a block diagram of a preferred embodiment of the dynamic version of the present invention.

A block diagram of the preferred embodiment of the dynamic version of the invention is illustrated in FIG. 4. Unlike the static version, the dynamic version of the invention automatically adjusts the $\pm 90°$ phase shift when the instantaneous frequency of the interfering carrier goes from being less to being greater than the instantaneous frequency of the desired carrier and vice versa. It is to be understood that the block diagram of the static version of the invention shown in FIG. 4 applies to both the generalized angle modulation case and to the angle modulation F.M. case; any differences between the two are noted in the following description. It is also understood that like stages in the dynamic version, shown in FIG. 4, and in the static version, shown in FIG. 3, have like reference numerals.

Referring to FIG. 4, bandpass filters 20, 22, demodulator 24, multiplier 26, low pass filter 28, attenuator 50 and subtractor means 52 are the same as their counterparts in FIG. 3, and have the same requirements and limitations as described above. The difference between the static and dynamic version of the invention resides in the function of a D.C. sensing means 56. The low frequency component from low pass filter 28 is applied to switch arm 32 of switch 30 and to D.C. sensing means 56. D.C. sensing means 56 constantly detects and monitors the sign of factor $[(\omega_2-\omega_1)t+\phi_2(t)-\phi_1(t)+\mu]$. When the instantaneous frequency of the interfering carrier is greater than the instantaneous frequency of the desired carrier (which results in the sign of the factor being positive), D. C. sensing means 56 provides an output control signal to a relay winding 58 associated with switch 30 and to a relay winding 60 associated with switch 42 which causes arm 32 to be in electrical connection with contact terminal 36 and arm 44 to be in electrical connection with contact terminal 46. This results in a $-90°$ electrical phase shift to the low frequency component from multiplier 26.

When, however, the instantaneous frequency of the interfering carrier is less than the instantaneous frequency of the desired carrier (which results in the sign of the factor being negative), D. C. sensing means 56 provides an output control signal to relay winding 58 and to relay winding 60 which causes arm 32 to be in electrical connection with contact terminal 34 and arm 44 to be in electrical connection with contact terminal 48. This results in a $+90°$ electrical phase shift to the low frequency component from multiplier 26.

It is obvious that mechanical relays 58, 60 may be replaced by similar switching devices which perform the same function; for example, semiconductor switching devices may be used. The constraint on D. C. sensing means 56 and the two associated switch devices is that the entire arrangement must be able to sense and switch as fast as the change in the relationship between the instantaneous frequency of the interfering carrier and the instantaneous frequency of the desired carrier. In other words, D. C. sensing means 56 must be able to sense and switch faster than the change in the sign of factor $[(\omega_2-\omega_1)t+\phi_2(t)-\phi_1(t)+\mu]$.

Laboratory measurements of baseband frequency interference cancellation using the static version of the invention, illustrated in FIG. 3, support the analysis which says that the demodulated desired signal of the first composite signal can be recovered at baseband frequencies by subtracting the low frequency component of the product of the first and second composite signals shifted by $\pm 90°$ from the demodulated first composite signal.

The measurements given below are for the angle modulation case of F.M. Specifically, the desired and interfering carriers each had F.M. modulation and constant envelope. A commercially available F.M. demodulator—R.C.A, Series 9102 was used in the measurements.

In FIG. 5, the ordinate is the noise power ratio (N.P.R.), defined as the ratio of the demodulated desired signal to the demodulated interference, in dB. The abscissa is the frequency separation between the desired and interfering carriers ($\Delta f$) in MHz. The measurements were made using the following parameters: desired carrier to interfering carrier ratio (C/I) of 10.0 dB; modulation indices on the desired and interfering carriers (m1, m2, respectively) of 1.0; and maximum baseband frequency of the desired and interfering carriers ($f_{m1}$, $f_{m2}$, respectively) of 552 KHz. The measured data shows that an improvement of approximately 15 dB is achieved regardless of carrier separation over the results obtained without baseband cancellation.

In FIG. 6, the ordinate is the N.P.R. in dB and the abscissa is the modulation index of the desired carrier (m1) normalized to the modulation index of the interfering carrier (m2) with m2=1.0. The measurements were made using the following parameters: C/1 of 10.0 dB; $\Delta f$ of 1.0 MHz; $f_{m1}$ of 552 KHz and $f_{m2}$ of 552 KHz. The measured data shows that an improvement of at least 12.5 dB is achieved over the results obtained without baseband cancellation when 20 log [m1/0.5] is between −3 and +6.

In FIG. 7, the ordinate is the N.P.R. in dB and the abscissa is C/I in dB. The measurements were made using the following parameters: m1 of 1.0 and m2 of 1.0; $f_{m1}$ of 552 KHz; $\Delta f$ of 1.0 MHz. The measured data shows that an improvement of at least 10 dB is achieved over the results obtained without baseband cancellation where C/I is greater than 5 dB.

While the invention has been particularly shown and described with reference to a preferred embodiment thereof, it will be understood by those skilled in the art that various changes in form and details may be made therein without departing from the spirit and scope of the invention.

What is claimed is:

1. A method of cancelling at baseband frequencies interference components in a first composite signal using a second composite signal, said first composite signal having a desired carrier with a constant envelope and being angle modulated with baseband $\phi_1(t)$ and a modulated interfering carrier, said second composite signal including said modulated interfering carrier, said method comprising the steps of:
    (a) angle demodulating said first composite signal to obtain an angle demodulated first composite signal,
    (b) multiplying said first composite signal with said second composite signal to obtain a product signal having high frequency and low frequency components,
    (c) filtering said product signal to obtain said low frequency component,
    (d) phase shifting said low frequency component 90 degrees to obtain a phase shifted signal,
    (e) attenuating said phase shifted signal to obtain an attenuated signal, and
    (f) subtracting said attenuated signal from said angle demodulated first composite signal.

2. The method as claimed in claim 1 wherein said desired carrier is frequency modulated with baseband $\phi_1(t)$ and the step of angle demodulating comprises frequency demodulating said first composite signal.

3. The method as claimed in claim 1 wherein the step of phase shifting comprises, sensing the relationship of the instantaneous frequency of said interfering carrier and the instantaneous frequency of said desired carrier, phase shifting said low frequency component by +90° when said instantaneous frequency of said desired carrier is greater than said instantaneous frequency of said interfering carrier, and phase shifting said low frequency component by −90° when said instantaneous frequency of said desired carrier is less than or equal to said instantaneous frequency of said interfering carrier.

4. The method as claimed in claim 3 wherein said desired carrier is frequency modulated with baseband $\phi_1(t)$ and the step of angle demodulating comprises frequency demodulating said first composite signal.

5. Apparatus for cancelling at baseband frequencies interference components in a first composite signal using a second composite signal, said first composite signal having a desired carrier with a constant envelope and being angle modulated with baseband $\phi_1(t)$ and a modulated interfering carrier, said second composite signal including said modulated interfering carrier, said apparatus comprising:
    (a) means for angle demodulating said first composite signal to form an angle demodulated first composite signal,
    (b) means for multiplying said first composite signal with said second composite signal to obtain a product signal having high frequency and low frequency components,
    (c) means for filtering said product signal to obtain said low frequency component,
    (d) phase shift means responsive to the output of said filtering means for selectively phase shifting said low frequency component to +90° and −90° to obtain a phase shifted signal,
    (e) attenuating means responsive to the output of said phase shift means for attenuating said phase shifted signal to obtain an attenuated signal, and
    (f) subtractor means for subtracting the output of said attenuating means from the output of said angle demodulating means.

6. Apparatus as claimed in claim 5 wherein said desired carrier is frequency modulated with baseband $\phi_1(t)$ and said angle demodulating means is a frequency demodulator.

7. Apparatus as claimed in claim 5, wherein said phase shift means comprises:
    (a) D.C. sensing means responsive to the output of said filtering means to provide a first control signal when said instantaneous frequency of said desired carrier is greater than said instantaneous frequency of said interfering carrier and to provide a second control signal when said instantaneous frequency of said desired carrier is less than or equal to said instantaneous frequency of said interfering carrier,
    (b) first means responsive to said first control signal for phase shifting by +90° the output of said envelope detecting means, and
    (c) second means responsive to said second control signal for phase shifting by −90° the output of said envelope detecting means.

* * * * *